May 6, 1952 L. E. LALANCETTE 2,595,392
APPARATUS FOR CLEANING POULTRY HOUSES
Filed May 21, 1948 3 Sheets-Sheet 1

Lawrence E. Lalancette
INVENTOR.

BY

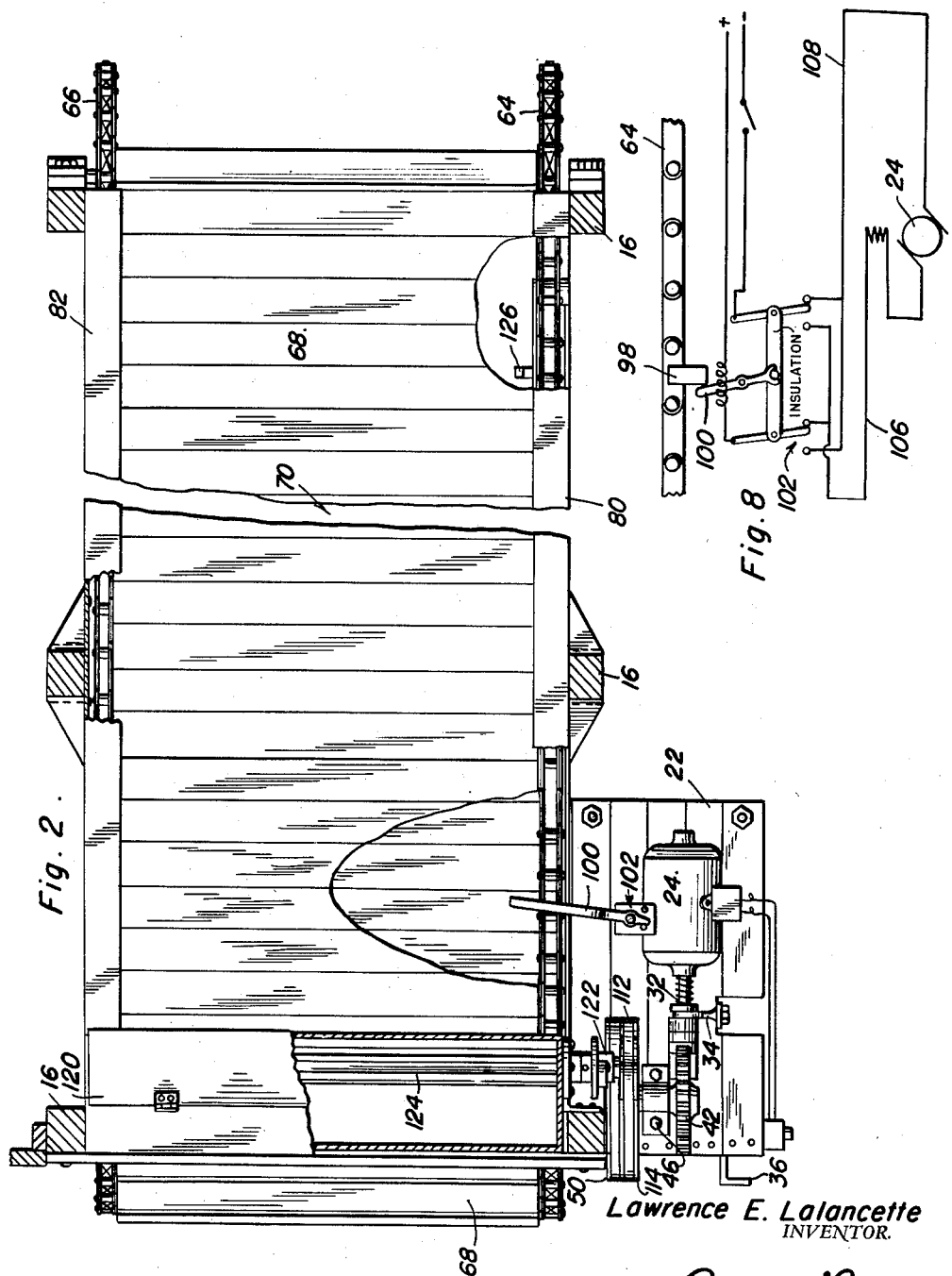

May 6, 1952  L. E. LALANCETTE  2,595,392
APPARATUS FOR CLEANING POULTRY HOUSES
Filed May 21, 1948  3 Sheets-Sheet 3
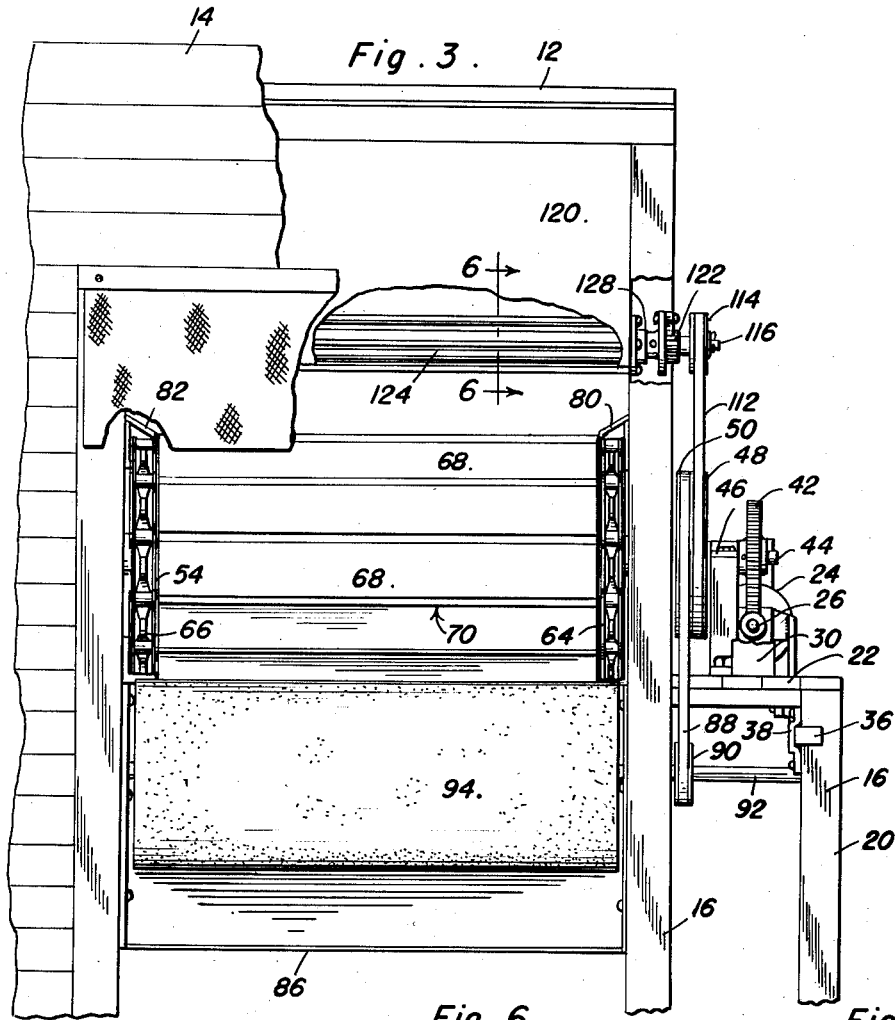
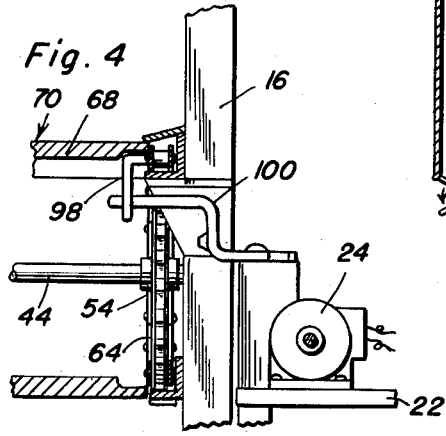
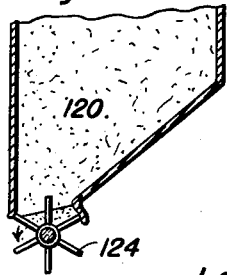
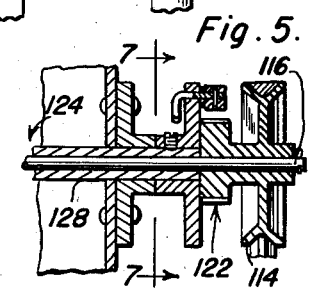
Lawrence E. Lalancette
INVENTOR.

Patented May 6, 1952

2,595,392

UNITED STATES PATENT OFFICE 2,595,392

APPARATUS FOR CLEANING POULTRY HOUSES

Lawrence E. Lalancette, Melrose Park, Ill.

Application May 21, 1948, Serial No. 28,448

2 Claims. (Cl. 119—21)

This invention relates to an apparatus for cleaning a poultry house and has for its primary object to efficient and conveniently clean the droppings board below the poultry roost.

Another important object of this invention is to provide an apparatus for cleaning the droppings board, whereby an operator may easily and conveniently maintain the roost and droppings board in a sanitary condition, without entering the poultry house itself and with a minimum of time and labor expended.

Another object of this invention is to provide an endless conveyor mounted below the poultry roost, the conveyor being automatically actuated and the movement of the conveyor controlling the successive cleaning operation, thus obviating manual labor and reducing the time normally required to clean the poultry house.

A meritorious feature of this invention resides in the provision of an endless conveyor mounted below a poultry roost, the conveyor being driven by a motor, having a reverse and forward switch, with means carried by the conveyor for actuating the switch.

Another important feature of this invention resides in the provision of a saw dust bin mounted above the conveyor and adapted to spread saw dust onto the conveyor to prevent droppings from adhering thereto, the spreading of the saw dust being controlled by a predetermined movement of the conveyor and successively actuated by the conveyor in such movement.

Another meritorious feature of this invention resides in the provision of a rotary cleaning brush, which is transversely mounted in the path of travel of the conveyor and which is operated responsive to movement of the conveyor.

Yet a further and important object of this invention is to provide an apparatus for removing the droppings from under the poultry roost, the apparatus being compact and durable in operation to bring about a more sanitary condition in the poultry house, result from a slight expenditure of labor.

These and ancillary objects and other meritorious features are attained by this invention, a preferred embodiment of which is set forth in the following description and illustrated in the accompanying drawings, wherein:

Figure 2 is a top plan view of this invention;

Figure 3 is an enlarged end elevational view, with part of the structure broken away;

Figure 4 is a further enlarged sectional view taken substantially on the plane of line 4—4 of Figure 1;

Figure 5 is an enlarged sectional view taken substantially on the line 5—5 of Figure 1;

Figure 6 is a sectional view taken substantially on the line 6—6 of Figure 3;

Figure 8 is a diagrammatic showing of the wiring for the reverse and forward switch carried by the motor, which controls the forward and reverse movement of the conveyor, responsive to a predetermined positioning of the conveyor.

Figures 1, 7:
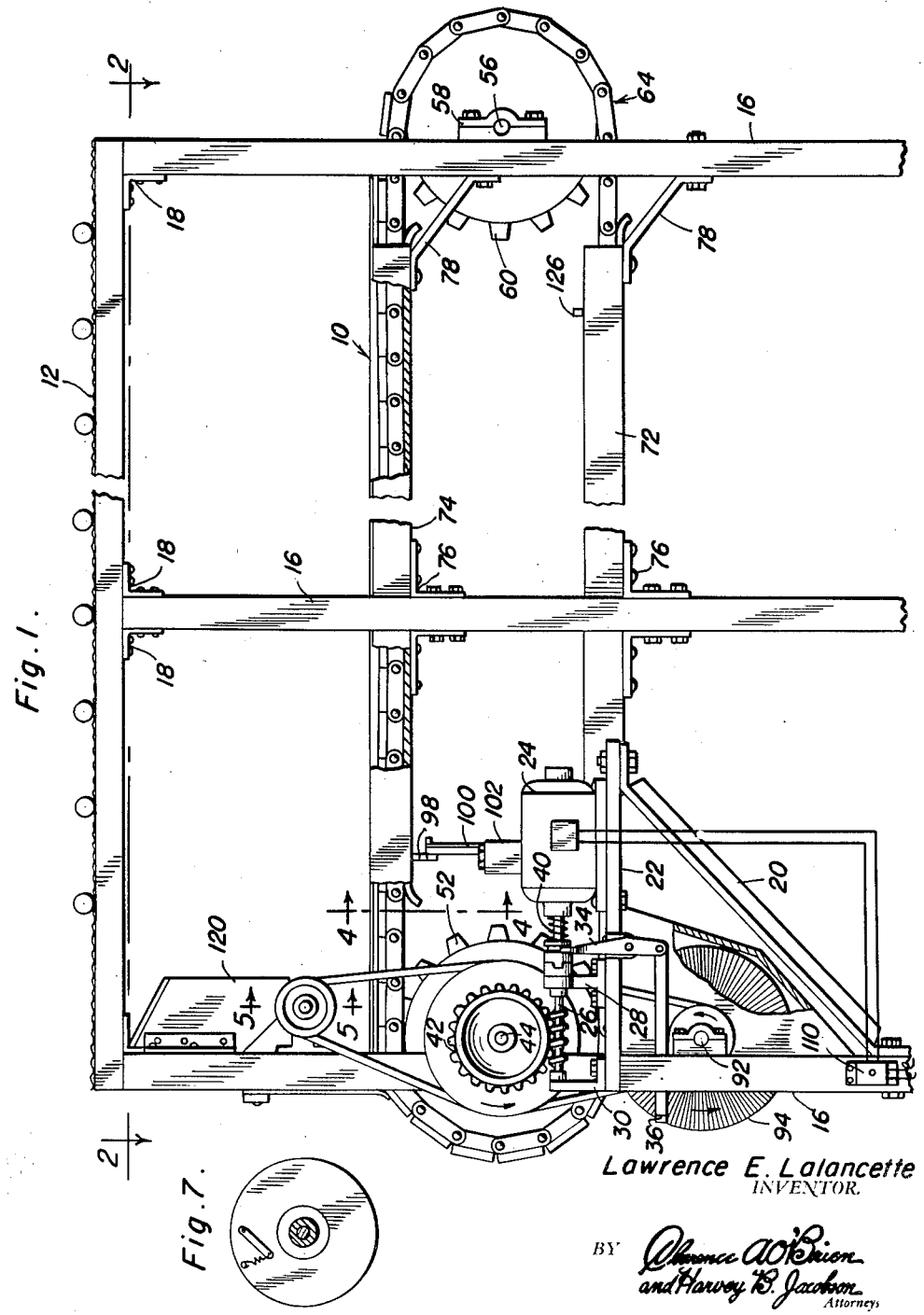
Figure 1 is a side elevational view of a poultry roost, showing this invention operatively associated therewith, with parts of the structure broken away to disclose the details of construction.
Figure 7 is a cross sectional view taken on the plane of line 7—7 of Figure 5.

Referring now more particularly to the drawings, wherein similar characters of reference designated corresponding parts throughout, this invention, generally designated by the character reference 10, is shown in operative association with a conventional poultry roost 12, the same being disposed within a poultry house 14. The poultry roost 12 is supported in a raised position by means of the spaced vertical standards 16, which are secured to the underside of the roost through the medium of the angle brackets 18. Secured to one of the end standards 16 and extending angularly therefrom is a raised support 20, which is adapted to support a shelf or supporting frame 22. Mounted on the supporting platform 22 is a conventional motor 24, having a forwardly projecting worm gear 26, the worm gear being rotatably supported by a pair of bearing brackets 28 and 30. A complementary disk clutch 32 is received on the worm gear and is actuated by means of a pivoted cam lever 34, having its opposite end pivoted to an actuating lever 36 which is bracketed by a bracket 38 to the inner surface of the standard 16. Of course, resilient means is provided to bias or urge the disk clutch into operative engagement, upon release of the actuating lever 36. A worm gear 42 secured to the extending end of a transverse shaft 44 is disposed in meshing engagement with the worm gear. The shaft 44 is supported by a bearing standard 46 disposed on the inner side of the worm gear 42. A pair of pulleys 48 and 50 are keyed on the shaft 44 between the bearing standard and the support standard 16. The pulleys 48 and 50 provide means in association with the shaft 44 and the motor 24 for actuating various cleaning devices, as will be later described.

Disposed between the standard 16 and received on the shaft 44 are a pair of sprocket wheels 52 and 54. In a similar manner, a shaft 56 is rotatably mounted in journal boxes 58, secured to the standard 16 at the opposite end, the shaft 56 serving to rotatably support a pair of transversely spaced sprocket wheels 60 and 62. The sprocket wheels 60 and 62 are disposed in longitudinal alignment with the sprocket wheels 52 and 54 and a pair of endless conveyor chains 64 and 66 are trained over the aligned sprockets. Transversely secured between the links, defining the endless chains 64 and 66 are a plurality of conveyor boards 68, which are secured to the links as by any suitable means, such as bolt assemblies or the like. The transverse boards 68 are each secured to a link, so that the boards are positioned close together and will serve as a droppings board 70.

Angle irons 72 and 74 are secured in vertical placement on the inner surfaces of the standards 16 and extend longitudinally with the roost 12. The angle irons 72 and 74, which are oppositely disposed serve as rail or guide ways for the links or conveyor chains 64 and 66. The angle irons are bracketed by means of brackets 76, secured to the center standard and end brackets 78 secured to the end standards and extending inwardly and upwardly therefrom. Of course, longitudinal guards 80 and 82 are disposed above the conveyor chains 64 and 66 and extend longitudinally therewith, the same being secured to the inner surfaces of the standards. The guards serve to prevent any droppings from falling on the links.

The operation of the device thus far is as follows. The motor 24, through the medium of the worm, meshing with the worm gear 42 moves the droppings board 70 forwardly or in a counter-clockwise movement, as seen in Figure 1 of the drawings. The board will move forward and deposit the droppings into a chute 86 disposed transversely between the end standards 16. During this forward movement a belt 88, secured on the pulley 50 and on a similar pulley 90, which is keyed on a transversely disposed shaft 92 is rotated. A rotary brush 94 is disposed on the shaft 92 and is rotated through the medium of the belt 88. The rotary brush rotates counterclockwise and brushes off any droppings left on the board 70, as shown in Figure 3. During the forward movement, a trip lug 98, depending from one of the links, will engage a switch lever 100, the switch lever 100 being a single throw double pole switch, of conventional description, mounted on the motor. The trip lug 98 will shut off the motor and at the same time make a contact for a reverse movement, which will be a clockwise movement of the droppings board 70. A forward and reverse switch 102 is moved on reverse position. Thus, with reference to Figure 8 of the drawings, it is to be noted that as the trip lug 98 engages the throw switch 100, the same being wired with the motor 24, which is mounted adjacent to the board, the reverse switch 102 correspondingly forms a circuit with the reverse wiring 106. The forward circuit 108 is shunted out. The wiring of the motor, as seen in Figure 8 of the drawings show the means provided for obtaining a forward and reverse movement of the droppings board. Of course, a relay 110 is wired in the circuit to eliminate the use of an automatic starter.

As the conveyor boards return to their original positions, during the reverse movement, a belt 112 trained over the pulley 48 and a smaller pulley 114 keyed on a shaft 116 is actuated, operating the shaft 116. A cam shaft 128 is transversely disposed through the bottom or open portion of a saw dust bin 120, which is mounted between the end standards 16 and disposed above the sprocket wheels 52 and 54. The pulley 114 rotates an integral ratchet unit 122, which actuates a dispensing wheel 124 secured on the shaft 128. The dispensing wheel 124 causes saw dust to be sprinkled from the bin onto the board so as to prevent any droppings from adhering or sticking to the board.

At a predetermined time during this movement, a stop arm lug 126 moves up and engages the switch lever 100 and shuts off the motor 24. The conveyor boards are then positioned below the roost and the device is ready for the next cleaning operation.

Thus, it is to be noted that there has been provided a device, which will easily and conveniently clean a poultry house, as the droppings from the roost are held by the movable droppings board 70. The forward movement of the droppings board advances the droppings into the guard chute 86 and the boards 68 are swept clean by the rotary brush 74. The reverse movement of the board causes saw dust to be disposed on the board. Thus, the boards are swept and saw dust is placed thereon to prevent the droppings from adhering to the boards, the foregoing operations being successive and responsive to the movement of the boards.

However, since many other objects and purposes of this invention, in view of the structure and arrangement of the conveyor or droppings board, will become apparent to those skilled in the art, upon a perusal of the foregoing description, in view of the accompanying drawings, it is to be understood that certain changes may be effected thereon, as coming within the spirit of the invention and the scope of the appended claims.

Having described the invention, what is claimed as new is:

1. The combination with a horizontal endless conveyor adapted for operation in opposite directions, and a sawdust dispenser over said conveyor including a rotary dispensing reel, of a worm drive for said conveyor, a reversible motor operating said drive, a starter switch for said motor, motor control means operatively associated with said conveyor and including a single lever operative in opposite directions and switch devices to which said lever is operatively connected to operate the same in either direction of movement of the lever to stop and condition said motor for reverse operation, lugs on said conveyor adapted to be engaged by opposite sides of said lever by operation of the conveyor in opposite directions whereby to operate the lever in opposite directions, and a one way drive for said reel between said worm drive and reel.

2. The combination with a horizontal endless conveyor adapted for operation in opposite directions and a sawdust dispenser over said conveyor including a rotary dispensing reel, of a worm drive for said conveyor, a reversible motor operating said drive, a starter switch for said motor, motor control means operatively associated with said conveyor and including a single lever operative in opposite directions and switch devices to which said lever is operatively connected to operate the same in either direction of movement of said lever to stop and condition said motor for reverse operation, lugs on said conveyor adapted to be engaged by opposite sides of said lever by operation of the conveyor in opposite directions whereby to operate the lever in opposite directions, and means operatively connecting said worm drive to said reel.

LAWRENCE E. LALANCETTE.

REFERENCES CITED

The following references are of record in the file of this patent:

UNITED STATES PATENTS

| Number | Name | Date |
|---|---|---|
| 1,090,131 | Bowditch | Mar. 17, 1914 |
| 1,159,129 | Tellefson | Nov. 2, 1915 |
| 1,334,458 | Johnson | Mar. 23, 1920 |
| 2,448,120 | Petraske | Aug. 31, 1948 |

FOREIGN PATENTS

| Number | Country | Date |
|---|---|---|
| 209,832 | Great Britain | Jan. 18, 1924 |
| 323,652 | Great Britain | Jan. 9, 1930 |